United States Patent [19]
Wüller

[11] Patent Number: 5,346,629
[45] Date of Patent: Sep. 13, 1994

[54] METHOD FOR PROCESSING FILTER BACKWASH FLUID FOR REUSE AS CLEANING FLUID

[75] Inventor: Karl-Heinz Wüller, Simmerath, Fed. Rep. of Germany

[73] Assignee: Durr GmbH, Stuttgart, Fed. Rep. of Germany

[21] Appl. No.: 948,681

[22] Filed: Sep. 22, 1992

[30] Foreign Application Priority Data

Oct. 5, 1991 [DE] Fed. Rep. of Germany ....... 4133099

[51] Int. Cl.$^5$ .............................................. B01D 21/30
[52] U.S. Cl. ........................................ 210/739; 134/10; 134/110; 210/791; 210/800; 210/808
[58] Field of Search ............... 210/167, 259, 411, 513, 210/739, 744, 769, 791, 793, 794, 798, 800, 803, 804, 805, 806, 808, 333.01, 333.1, 521; 134/110, 111, 10

[56] References Cited

U.S. PATENT DOCUMENTS

| | | | |
|---|---|---|---|
| 2,946,443 | 7/1960 | Schmidt | 210/513 |
| 3,994,702 | 11/1976 | Schweimanns et al. | 210/800 |
| 4,352,739 | 10/1982 | Oliver et al. | 210/791 |
| 4,871,449 | 10/1989 | Lott | 210/521 |
| 5,223,156 | 6/1993 | Maier | 210/800 |

FOREIGN PATENT DOCUMENTS

| | | | |
|---|---|---|---|
| 3800613 | 7/1989 | Fed. Rep. of Germany | 210/411 |
| 17335 | of 1893 | United Kingdom | 210/513 |

Primary Examiner—Joseph W. Drodge
Attorney, Agent, or Firm—Reising, Ethington, Barnard, Perry & Milton

[57] ABSTRACT

A method for processing a flush-back fluid containing impurities after its use in a flush-back filter for cleaning fluid used in a cleaning process is accomplished in accordance with the invention in that flush-back fluid drawn from the flush-back filter is subjected to a sedimentation process and hereby acted upon at least from time to time by pressure and that after completion of the sedimentation process the flush-back fluid is separated in a pressure-tight manner from a least at least a portion of a sediment recovered thereby and the latter is subsequently removed and a part of the flush-back fluid cleansed at least to a large extent of impurities is returned to the cleaning process.

8 Claims, 1 Drawing Sheet

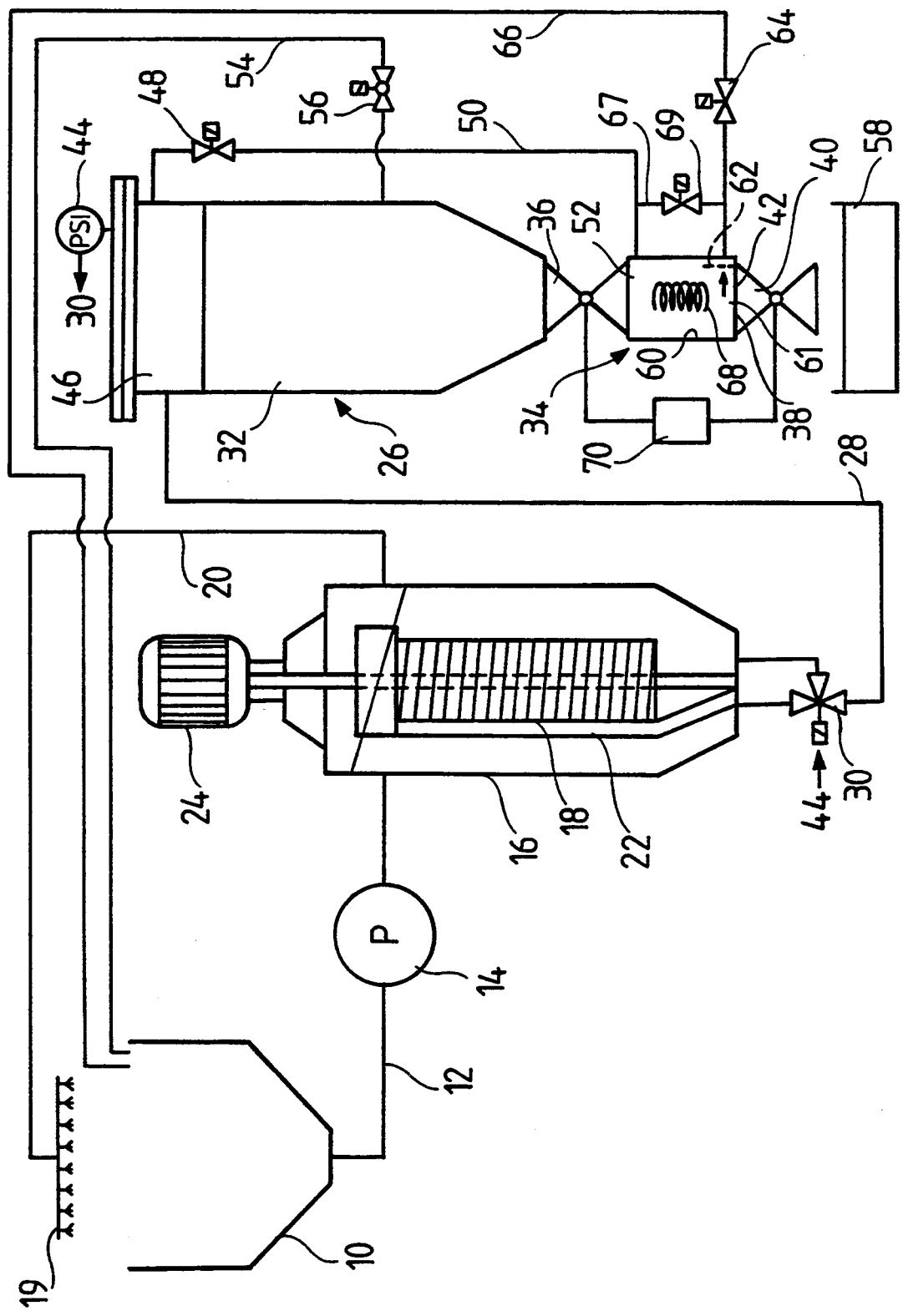

METHOD FOR PROCESSING FILTER BACKWASH FLUID FOR REUSE AS CLEANING FLUID

TECHNICAL FIELD

The invention relates to a method for processing a flush-back fluid containing impurities in a flush-back filter for a cleaning fluid used in a cleaning process. The object of this processing is to separate impurities from the flush-back fluid. In addition, the invention relates to a sedimentation apparatus for processing a cleaning fluid containing impurities in an industrial cleaning process comprising a sedimentation tank including an inlet, this tank having a first region for accommodating the cleaning fluid to be treated by sedimentation as well as a sediment collecting region located therebelow.

BACKGROUND OF THE INVENTION

In known methods, solid impurities are removed from flush-back fluid drawn off from the flush-back filter by using flat material web filters, in particular endless paper band filters. In this respect, a flat material web filter is arranged over a collecting tank for flush-back fluid, which is dimensioned so as to be sufficiently large. Once it has been conveyed to the band filter, the flush-back fluid discharged from the flush-back filter passes through the filter material, and impurities are removed to a large extent from this fluid which then flows into the collecting tank while the separated impurities are transported into a separate disposal tank with the continuously or cyclically unrolling band filter. The flush-back fluid collecting in the collecting tank for the flush-back fluid is returned to the cleaning process or, if required, to the flush-back filter via a line comprising a pump. This results in the fluid being conveyed in a circuit. Methods of this type do, however, have the disadvantage that the resulting amounts of filter material are quite considerable and these have to be disposed of together with the impurities located thereon. In view of the necessarily large quantities of the cleaning fluid, which is primarily to be processed, flowing through the flush-back filter and in view of the pressure required at treating systems of the cleaning process, such as, for example, nozzles, the pressures prevailing in the interior of the flush-back filter are between 3 and 10 bars and so the discharge of flush-back fluid from the flush-back filter proves to be extremely problematic. On the one hand, the discharge opening provided in the flush-back filter would have to be as small as possible to limit the outflowing amount of flush-back fluid; on the other hand, the discharge opening would have to be designed sufficiently large in order not to become blocked. When using a discharge opening of small design or a throttle valve, there is, apart from the risk of clogging, the risk of the resulting strong stream of fluid damaging the flat material web filter. For this reason, in a known flush-back filter, a discharge line comprising a throttle valve opens into a steadying tank, which is of extremely large dimensions and from which the flush-back fluid loaded with impurities is then passed to the flat material web filter. An additional disadvantage of known processing methods is the fact that due to the partially open mode of operation considerable amounts of energy are lost by vaporization of the flush-back fluid originally used in the cleaning process as heated cleaning fluid as well as due to a necessarily poor insulation. An additional disadvantage is to be seen in the fact that in the known partially open mode of operation the surroundings are moistened to a considerable degree by evaporation and the escape of vapors and in this way chemical components are discharged into the environment.

SUMMARY OF THE INVENTION

The object underlying the present invention is, therefore, to develop a method of the type described at the outset, in which the disadvantages described above do not occur and which can be performed more economically and, with respect to the susceptibility to breakdowns caused, for example, by clogging, more reliably than the known methods.

Proceeding on the basis of a method of the type described at the outset, this object may be accomplished in accordance with the invention in that flush-back fluid drawn from the flush-back filter is subjected to a sedimentation process and hereby acted upon at least from time to time by pressure and that after completion of the sedimentation process the flush-back fluid is separated in a pressure-tight manner from at least a portion of a sediment recovered thereby and the latter is subsequently removed and a part of the flush-back fluid cleansed at least to a large extent of impurities is returned to the cleaning process.

DE-OS 38 00 613 discloses a method and plant for processing water or cleaning waste water, primarily for its final cleaning. The method according to the invention relates, however, to a method for processing a cleaning fluid of a cleaning process, which contains impurities and results as a flush-back fluid of a flush-back filter. Therefore, the known method is, as such, of a different generic type. The cited publication does not make even the merest mention of the problem of removing sediment and it also does not disclose any reference to a separation of a portion of the sediment from flush-back fluid located above it.

Instead of the filtration of flush-back fluid drawn from the flush-back filter using filter aids, such as endless paper band filters, the inventive method uses a sedimentation process which is performed without the use of filter aids. Due to the fact that the flush-back fluid to be processed is conveyed for this purpose into a sedimentation tank which is closed so as to be pressure-tight, a sufficiently large discharge opening can be provided in the flush-back filter to prevent clogging since the sedimentation tank which is closed so as to be pressure-tight limits the discharge of flush-back fluid from the flush-back filter to its volume. Since the flush-back fluid is acted upon by pressure during the sedimentation process at least from time to time, the sinking times for compressible and/or porous impurities are reduced. Compressible and/or porous impurities, such as cellulose, wood chippings etc., the density of which is normally less than the density of the flush-back fluid and which do not, therefore, sediment in the state of the art, are caused to sink by the pressure used in accordance with the invention.

Due to the fact that after completion of the sedimentation process, i.e. when the flush-back fluid located above the separated sediment is cleansed to a great extent from impurities, the flush-back fluid is separated in a pressure-tight manner from at least a portion of the sediment, separated impurities of the separated portion of the sediment are no longer affected by turbulences, which occur during the return of flush-back fluid, or even returned to the cleaning process. An additional advantage is to be seen in the fact that the order of the method steps "return of flush-back fluid" and "removal of sediment" can be varied since no flush-back fluid can escape during the removal of sediment due to the pressure-tight separation.

The inventive method proves to be especially advantageous when, in the case of heavily contaminated flush-back fluid, the volume of a sediment collecting region provided for accommodating the sediment is insufficient to accommodate the entire sediment and, therefore, only a portion of the sediment is separated from the flush-back fluid. In this case, this separated portion can be removed and, subsequently, the sedimentation process continued after elimination of the separation until the entire remaining sediment has been collected in the sediment collecting region. This mode of operation can therefore prevent sedimented impurities being affected by turbulences during the return of flush-back fluid to the cleaning process and likewise being returned.

After separation of at least a portion of the sediment, the flush-back fluid can be returned at least partially to the cleaning process. In this respect, it is advantageous for the sedimentation tank to be arranged such that the level of the "sedimenting fluid", i.e. of the flush-back fluid containing impurities which is just being subjected to a sedimentation process, is above the level of the cleaning fluid used in the cleaning process so that the flush-back fluid can be returned to the cleaning process without a pump needing to be used. If a pump having an adequately high output pressure is provided, the flush-back fluid can also be returned, entirely or partially, directly to the flush-back filter.

Furthermore, it is conceivable to subject flush-back fluid to be returned to the cleaning process to an additional treatment process before being introduced into the cleaning process. In this additional process, emulsified oils and/or fats are, for example, separated as well as surfactants and detergents recovered.

The pressure acting on the sedimenting fluid can be generated in any optional manner, such as, for example, by columns of liquid or pumps provided for this purpose. It is, however, particularly advantageous and simple to have the pressure prevalent at the inflow side of the flush-back filter acting on the sedimenting fluid.

The sedimentation tank serving to perform the method and closed so as to be pressure-tight could be filled completely with flush-back fluid to be sedimented. It is, however, more advantageous for a cushion of compressed air to be formed above the fluid to be sedimented during the course of pressure acting hereon or during the filling of the sedimentation tank. If, for example, the sedimentation tank, which contains only air and is closed so as to be pressure-tight, is filled with fluid subject to a system pressure, the air contained in the tank will be compressed and, following the filling process, will be present in an upper region of the tank in the form of a compressed-air cushion having the system pressure. This compressed-air cushion represents a working capacity and can, if required, be expanded to eject the sediment or also to blow out lines or the like. This air cushion also prevents any water-hammering.

Since sedimented substances or a sediment cake which is formed tend to adhere to the walls of the sediment collecting region surrounding them, the removal of sediment often proves to be difficult. This is obviated in accordance with the invention in that the compressed-air cushion mentioned above, which is located over the aqueous phase, can be used and expanded to eject the sediment with the aid of compressed air once the flush-back fluid, as also described above, has been separated in a pressure-tight manner from a portion of the sediment. The sediment cake is then "blasted" out of the sediment collecting region.

Since the separated part of the sediment not only consists of impurities but, in addition, also contains fluid, it is advantageous, prior to removing the sediment, to drain off the fluid and return it to the cleaning process, to a soiled side of the cleaning process if one is present.

A constant time can be determined for the duration of the sedimentation process. With respect to an economic mode of operation, the duration of the sedimentation process is, however, preferably determined by the type and degree of soiling of the flush-back fluid.

With regard to automation of the mode of operation, it is advantageous for the sedimentation process to be terminated by a sensor measuring the amount of sediment. In this way, the length of the sedimentation process is specified automatically and economically without information concerning the degree of contamination and specific sinking speeds of different impurities having to be known.

To conclude the sedimentation process the return of flush-back fluid and/or the pressure-tight separation of at least a portion of the sediment from the flush-back fluid is initiated by this sensor. Subsequent thereto, the ejection of the sediment is triggered preferably by sensor control.

In accordance with an additional object underlying the invention, it is intended to provide a sedimentation apparatus, with the aid of which it is possible quite generally to improve and/or accelerate the separation of impurities from a cleaning fluid by sedimentation. For accomplishing this object, in accordance with an additional concept of the invention, a sedimentation apparatus of the type described at the outset is designed such that the first region and the sediment collecting region are separable from one another in a pressure-tight manner by a separating device and that the sediment collecting region has a tank outlet closable by a closure member for discharging the sediment.

In this respect, it is advantageous for the sedimentation tank to be designed as a pressure tank so that it can be filled with cleaning fluid which is subject to pressure or that cleaning fluid sedimenting in the sedimentation tank can be acted upon by pressure, for which purpose suitable means are to be provided.

It has proven to be particularly advantageous to provide a connecting line including a valve which runs from an upper section of the sedimentation tank, which is designed to accommodate a compressed-air cushion, to the sediment collecting region. The compressed-air cushion can be expanded into the sediment collecting region via this line and then aid in ejecting the sediment. In this regard, it is recommendable to have the connecting line leading into an upper zone of the sediment collecting region.

It is especially advantageous for the inventive sedimentation apparatus or the sedimentation tank to be connectable to a flush-back filter via the tank inlet and be used for performing the inventive method.

In order to enable a circulation of the cleaning fluid taken from a cleaning process for regeneration or the flush-back fluid of a flush-back filter connected to the outlet side of the cleaning process, it is suggested that a return line be provided which connects the first region of the sedimentation tank with the cleaning process. Insofar as the cleaning process comprises, for example, nozzle means for spraying the objects to be cleaned and a cleaning fluid collecting tank for collecting the cleaning fluid, it is advantageous for the return line to connect the first region with the collecting tank arranged on the outflow or soiled side of the nozzle means.

In a preferred embodiment of the sedimentation apparatus, a pressure switch is provided in the upper section for controlling a supply valve located in the tank inlet. This has the advantage that when filling the tank with a fluid subject to a system pressure, the tank can be automatically closed when the system pressure is reached in the tank, due to closure of the supply valve controlled by the pressure switch, and, therefore, the filling procedure can be automatically terminated.

The first region and the sediment collecting region of the sedimentation tank can be defined by two regions of a single tank which can be sealed relative to one another. These two regions can also be two separate tanks which are connected via a line having an adequate diameter or by the separating device. In a preferred embodiment, the sediment collecting region is even designed as a detachable sediment collecting chamber. This can prove to be particularly favorable when the sediment comprises toxic substances which can then be transported within the sediment collecting chamber to special disposal plants.

In addition, it is suggested that the sedimentation apparatus be designed such that the degree of fill of the sediment collecting region can be ascertained at any time. For this purpose, it is advantageous to arrange a sensor in the sediment collecting region which could, for example, respond in an inductive manner to iron filings or the like invariably present. In this case, it is especially favorable for the separating device to be sensor-controlled and to interact with the sensor such that it automatically closes when a predetermined nominal fill state of the sediment collecting region is reached.

Furthermore, the separating device is expediently designed such that its passage area is many times greater than the diameter of the sedimenting impurities so that these do not clog the separating device. Particularly large and well sealable passage areas may be achieved with flat slide valves. For this reason, these valves are preferably used in inventive sedimentation apparatuses both as separating device and as closure member for the sediment collecting region. Stopcocks could also be used for this purpose.

In order to reduce the consequences of the sediment cake adhering to the walls of the sediment collecting region, it is suggested that a preferred sedimentation apparatus or rather a preferred sedimentation tank be designed such that the sediment collecting region widens conically downwards. In order to reduce the risk of clogging in the separating device and to ensure that sedimenting impurities can reach the sediment collecting region as completely as possible, the sedimentation tank is preferably designed such that the first region tapers conically downwards.

Since, after the end of the sedimentation process, i.e. after the separating device has closed, fluid is also present in the sediment collecting region along with separated sediment, particularly when the sediment collecting region is filled only partially with separated sediment, it is suggested that a screen device be provided in a lower zone of the sediment collecting region. In this way, fluid present in the sediment collecting region prior to discharge of the sediment can be drained off and collected, as well as returned to the cleaning process. An additional return line is provided for this purpose. The screen device can preferably be embedded flush with the wall of the sediment collecting region so that it does not project into the interior of the sediment collecting region and thereby hinder the sediment ejection.

If, during the course of draining the fluid found in the sediment collecting region, a portion of the compressed-air cushion is expanded in a measured manner into the sediment collecting region via the connecting line including a valve and fluid is thereby blown out of the sediment collecting region, the proportion of fluid discharged with the separated sediment out of the cleaning process is reduced still further.

BRIEF DESCRIPTION OF THE FIGURE

Additional details, features and advantages of the invention result from a description based on the sole FIGURE which is schematic drawing of a system comprising an inventive sedimentation apparatus for performing the inventive method for processing a flush-back filter.

DETAILED DESCRIPTION OF THE INVENTION

In detail, the drawing shows a cleaning apparatus 10, schematically illustrated as a cleaning bath, for cleaning objects soiled, in particular, with solid substances. This can, however, also be a cleaning fluid collecting tank for collecting used cleaning fluid supplied from various cleaning processes and for passing this on to a regenerating process. A cleaning fluid line 12 leads away from the base of the cleaning apparatus 10. This line includes a pump 14 serving to generate a system pressure and opens into a flush-back filter 16. The cleaning fluid line 12 as well as the pump 14 are designed such that used cleaning fluid including solid impurities contained therein up to a size of approximately 20 mm can be conveyed from the cleaning apparatus 10 to the flush-back filter 16. To protect the pump 14, larger foreign bodies are expediently retained by a pump protection screen which is not illustrated.

Filter elements 18, in particular wire slit filter elements, are arranged in the interior of the flush-back filter 16 such that the cleaning fluid to be processed flows through them from the outside inwards. The majority of the impurities contained in the cleaning fluid remain on the outside of the filter elements 18 and a permeate thereby formed and cleansed to a great extent from impurities is returned at least partially to the cleaning apparatus 10 via a permeate return line 20 connecting the outflow side of the flush-back filter 16 with nozzle devices 19 spraying into the cleaning apparatus 10.

The filter elements 18 of the flush-back filter 16 are, in the embodiment illustrated, of a cylindrical design or form a cylindrical screen cage, through which cleaning fluid conveyed by the pump 14 into the flush-back filter 16 flows during operation of the filter. A partition wall arranged at an angle separates the inflow side from the outflow side of the flush-back filter 16, which is formed, inter alia, by the interior of the screen cage.

In order to prevent the filter elements 18 becoming clogged, these are continuously or intermittently cleaned by a flush-back process known per se. In particular when the filter elements 18 have smooth surfaces, it has proven favorable for the filter surfaces to be scraped free mechanically. Since, when using wire slit filter elements, this form of cleaning merely represents a rough cleaning of the filter elements since only the dirt located on the surface of a wire slit filter element can be removed by mechanical scraping, the screen cage of the flush-back filter 16 under consideration is both flushed back in a known manner which does not require any explanation and also mechanically cleaned by a schematically illustrated scraper device 22, which rotates around the screen cage intermittently or continuously by means of an electric drive 24.

For discharging the flush-back fluid containing impurities from a lower region on the inflow side of the flush back filter 16 or to separate the impurities from the flush-back fluid, an inventive sedimentation apparatus is, as shown in the drawing, provided with a sedimentation tank 26 which is connected with the flush-back filter 16 via a tank inlet line 28 and a supply valve 30. The sedimentation tank 26 comprises a first region 32 and a sediment collecting region 34 located therebelow which are separable from one another by means of a separating device 36. The sediment collecting region 34 has at a lower end 38 a tank outlet 42 closable by means of a closure member 40. In this respect, it is advantageous for the tank outlet 42 to encompass an entire cross-sectional area of the sediment collecting region 34 which can either be opened up by the closure member 40 or covered or rather closed.

The closure member 40 and also the separating device 36 are preferably formed by flat slide valves since these are suitable for opening up or covering large cross-sectional areas. In the present embodiment, the sediment collecting region 34 is designed as a sediment collecting chamber separated from the first region 32 but connected with it via the separating device 36. The sedimentation tank 26 is also designed to be pressure-tight and has a pressure switch 44 interacting with the supply valve 30 arranged in the tank inlet line 28. A connecting line 50 provided with a valve 48 leads from an upper section 46 of the first region 32 to an upper zone 52 of the sediment collecting region 34. A return line 54 with an additional valve 56 connects a lower section of the first region 32 of the sedimentation tank 26 with the cleaning apparatus 10.

In the basic state of the sedimentation apparatus, i.e. before one pressure sedimentation cycle commences and after the previous pressure sedimentation cycle has terminated, the sedimentation tank 26 is empty except for a slight residue of fluid in its first region 32, and the shut-off fixtures are closed, except for the separating device 36 to the sediment collecting region 34. To initiate a new sedimentation cycle, the supply valve 30 is opened, and the sedimentation tank 26 is filled with flush-back fluid in a few seconds due to the system pressure in the region of between 3 and 6 bars or even higher prevailing at the inflow side of the flush-back filter. The volume of air of, e.g., 70 liters located in the tank interior is hereby displaced and compressed, a cushion of compressed air having the system pressure forming in the upper section 46 of the first region 32. The supply valve 30 in the tank inlet 28 can now be closed to end the filling procedure. In the embodiment to be described, it is particularly advantageous for the pressure switch 44 to be adjustable to a specific system pressure and to actuate the supply valve 30 once this system pressure is reached in the interior of the sedimentation tank 26 so that the supply valve is closed. To make the filling procedure completely automatic it is also conceivable and advantageous to design the pressure switch 44 so that it opens the supply valve 30 and flush-back fluid flows into the sedimentation tank 26 as soon as the basic state of the sedimentation apparatus is reached and the pressure in the interior is approximately 1 bar. In this respect, it is advantageous, in addition, for the pressure switch 44 and the shut-off fixtures to interact in such a manner that the pressure switch 44 can only open the supply valve 30 when all the system components are in the basic state described above.

Once the sedimentation tank 26 has been filled and the flush-back fluid in the interior of the tank has become calm, the sedimentation phase begins. Downwardly sinking solid impurities pass through the opened separating device 36 into the sediment collecting region 34 and displace the flush-back fluid located therein. Due to the inventive pressure acting on the sedimenting flush-back fluid, it is possible, in accordance with the invention, for compressible and/or porous substances, such as, for example, cellulose, wood chips etc., the density of which is, under normal conditions, below that of an aqueous cleaning fluid and which would not, therefore, settle, to be compressed and/or absorb fluid to an increased degree so that their density increases and they sink to the bottom. Since the flush-back fluid, as explained at the outset, can contain impurities having a diameter in the order of magnitude of 20 mm, it is advantageous for the separating device 36 to have an adequately large passage cross section to allow the sedimenting substances to pass into the sediment collecting region 34 without clogging the separating device. For this reason, a flat slide valve is, as already mentioned, used as separating device 36. Stopcocks would also seem to be suitable for this purpose. The diameters of the passage cross sections of the separating device 36 and the closure member 49 are, in this case, 65 and 100 mm, respectively. In addition, it is advantageous for the first region 32 of the sedimentation tank 26 to taper conically downwards and thereby lead funnel-shaped into the separating device 36 or the sediment collecting region 34.

When the sediment collecting region 34 is filled with settled impurities or when the flush-back fluid located in the first region 32 is cleansed to a large extent of impurities, the sedimentation phase can be terminated by closing the separating device 36. The duration of the sedimentation phase is determined in accordance with the type and degree of contamination of the flush-back fluid. Average sedimentation or settling times are between 10 and 30 minutes.

For discharging the sedimented impurities and the remaining flush-back fluid out of the sediment collecting region 34, the closure member 40 could simply be opened so that the contents of the sediment collecting region 34 can drop through the tank outlet 42 into a dirt tank 58. A sediment cake, which is formed, in particular, at a high system pressure and/or of compressible impurities in the sediment collecting region 34, does, however, tend especially to adhere to the walls 60 of the sediment collecting region 34 which hinders the discharge of sediment from the sediment collecting region 34. For this reason, it is of particular advantage to use the compressed-air cushion formed in accordance with the invention in the upper section 46 of the first region 32 for discharging the sediment with the aid of compressed air in accordance with the invention. Once the closure member 40 is open, the compressed-air cushion is expanded explosively, in accordance with the invention, via the connecting line 50 and the opened valve 48 into the upper zone 52 of the sediment collecting region 34, which causes the sediment cake to be pressed or blasted out of the sediment collecting region 34. In this respect, it is particularly advantageous for the sediment collecting region 34 to widen conically downwards.

In a lower zone 61 of the sediment collecting region 34, a screen device 62 is provided to enable, first of all, only fluid to be discharged from the sediment collecting region 34. This fluid can be returned to the cleaning apparatus 10 via an additional return line 66 comprising a third valve 64. In order to blast the flush-back fluid present in the sediment collecting region 34 as completely as possible out of the sediment collecting region 34, a portion of the compressed air is, in accordance with an additional inventive concept, expanded out of the compressed-air cushion via the connecting line 50 into the upper zone 52 of the sediment collecting region 34. In this respect, it is advantageous for the valve 48 to be designed as a dosaging valve so that the sediment collecting region 34 provided with the screen device 62 is not subject to the entire system pressure but that an adjustable stream of air flows through the connecting line 50 into the sediment collecting region 34 and through the sediment cake located therein and that the residual flush-back fluid is therefore blown through the screen device 62 into the return line 66 and finally returned to the cleaning apparatus 10. It is especially favorable to use only a part of the compressed-air cushion for this and then to expand the compressed-air cushion into the sediment collecting region 34, as described above, through the completely opened valve 48 to eject the sediment with the aid of compressed air. At the same time, the screen-like component 62 can be blasted clean by a portion of the accumulated compressed air and from the outside inwards, i.e. contrary to the direction of flow, for which purpose a branch line 67 connecting the connecting line 50 and the additional return line 66 and having a fourth valve 69 is provided. When this fourth valve 69 is opened for this purpose, it is recommended that the third valve 64 be kept closed.

Flush-back fluid which has been cleansed to a large extent from impurities is expediently returned to the cleaning apparatus 10 from the first region 32 via the return line 54 when the closure member 40 and the valve 48 are both opened. If, for example, fluid is returned to the cleaning apparatus 10 via the return line 54 when the valve 56 is likewise open, ambient air can pass into the first region 32 of the sedimentation tank 26 via the connecting line 50, when the closure member 40 and the valve 48 are both open, in order to equalize the pressure. Otherwise, an underpressure would result in the first region 32 and hinder the continued return of flush-back fluid. Alternatively, a ventilation valve could be provided in the upper section 46 of the first region 32. Once the flush-back fluid has been returned more or less completely, which can be determined via a pressure switch or a timer, the sedimentation apparatus is returned to its basic state by closing the closure member 40 as well as the valves 48 and 56 and subsequently opening the separating device 36.

For automation of the filling procedure it is expedient and advantageous to likewise automate the termination of the sedimentation phase as well as the ejection of sediment and the recovery of an aqueous phase cleansed to a large extent of impurities. For this purpose, a sensor 68 measuring the degree of fill can be provided in the sediment collecting region 34. When a set degree of fill is reached in the sediment collecting region 34, this sensor actuates the separating device 36 and thereby terminates the sedimentation phase. This sensor could be one operating inductively, which responds to metallic components, such as shavings and the like, which are always present in the sediment. It is then advantageous for the sensor to open the closure member 40 after the separating device 36 is closed and, subsequently, to open the valve 48 for ejection of the sediment with the aid of compressed air. Once the sediment collecting region 34 has been emptied, the same sensor could then cause the valve 48 and the closure member 40 to close. Due to a pressure sensor, which senses the drop in pressure in the first region 32 resulting from the ejection of sediment with the aid of compressed air, the return of the flush-back fluid to the cleaning apparatus 10 can then be initiated by actuating the valve 56. It is then advantageous for a ventilation valve to be provided in the upper section 46. After a certain time, the basic state of the inventive sedimentation apparatus could be reestablished by automatic closing of the valve 56 and by opening of the separating device 36. Other possibilities for controlling the valves and the closure devices of the inventive sedimentation apparatus are, of course, conceivable.

The inventive sedimentation apparatus can advantageously be connected to any optional cleaning fluid system and, for example, used as well as a highly efficient solids separator in conjunction with processing devices which are mainly aimed at recovering surfactants and detergents but have only a few efficient solids separating means.

The present disclosure relates to the subject matter disclosed in German application No. P 41 33 099.4 of Oct. 5, 1991, the entire specification of which is incorporated herein by reference.

What is claimed is:

1. A method of cleaning a contaminated backwashing liquid which contains impurities removed from filter means by backflushing said filter means with said backwashing liquid, said method comprising the steps of:
   (a) forming a volume from at least a portion of said contaminated backwashing liquid;
   (b) allowing said volume to stand for a first time period thereby allowing at least some of said impurities to settle within said volume;
   (c) applying a positive pressure to said volume after said first time period during a second time period while said volume is allowed to stand, said second time period being at the most as long as said first time period, thereby increasing the sedimentation rate of said impurities;
   (d) performing a pressure-tight separation of a lower portion of said volume containing settled impurities from an upper portion of said volume after said first time period has elapsed; and
   (e) removing one of said portions of said volume from the other of said portions thereby recovering at least a major portion of the used backwashing fluid.

2. A method of industrially cleaning objects, wherein said objects are cleaned in a cleaning process with the aid of a cleaning liquid and wherein at least a portion of the used cleaning liquid comprising impurities washed from said objects is pumped through filter means having an inlet side and an outlet side, thereby retaining impurities at said filter means, and then returned into said cleaning process, said method also comprising the steps of:

(a) backflushing said filter means with said cleaning liquid thereby obtaining a contaminated backwashing liquid consisting of cleaning liquid and impurities previously retained by the filter means;

(b) forming a volume from at least a portion of said contaminated backwashing liquid;

(c) allowing said volume to stand for a first time period thereby allowing at least some of said impurities to settle within said volume;

(d) applying a positive pressure to said volume during a second time period while said volume is allowed to stand, said second time period being at the most as long as said first time period, thereby increasing the sedimentation rate of said impurities;

(e) performing a pressure-tight separation of a lower portion of said volume containing settled impurities from an upper portion of said volume after said first time period has elapsed;

(f) removing one of said portions of said volume from the other of said portions thereby recovering at least a major portion of the cleaning liquid used for backflushing said filter means; and (g) returning said recovered cleaning liquid portion into said cleaning process.

3. The method as recited in claim 1 or 2, wherein during said first time period said volume is confined within a container means in which an air cushion is formed above said volume and compressed during the formation of said volume within said container means, thereby forming a pressure source acting on said volume during said second time period.

4. The method as recited in claim 3, wherein said lower portion is removed from said container means with the aid of compressed air and said lower portion is acted upon by the compressed air of said air cushion.

5. The method as recited in claim 4, wherein the removing of said lower portion is triggered by sensor means responsive to said settled impurities.

6. The method as recited in claim 3, wherein the forming of said volume is terminated under the control of sensor means responsive to the pressure in said air cushion.

7. The method as recited in claim 1 or 2, wherein the length of said first time period is determined by sensor means responsive to said settled impurities.

8. The method as recited in claim 2, wherein, for applying pressure to said volume, the inlet side of said filter means is brought into communication with said volume.

* * * * *